United States Patent
Reinsch et al.

(10) Patent No.: US 10,890,064 B2
(45) Date of Patent: Jan. 12, 2021

(54) METHOD AND SYSTEM FOR MONITORING A MATERIAL AND/OR A DEVICE IN A BORE HOLE USING A FIBER OPTIC MEASURING CABLE

(71) Applicant: Helmholtz-Zentrum Potsdam—Deutsches GeoForschungsZentrum GFZ, Potsdam (DE)

(72) Inventors: Thomas Reinsch, Berlin (DE); Santiago Ruben Aldaz Cifuentes, Potsdam (DE); Tobias Raab, Berlin (DE); Martin Lipus, Berlin (DE); Philippe Jousset, Berlin (DE); Jan Henninges, Berlin (DE)

(73) Assignee: HELMHOLTZ-ZENTRUM POTSDAM—DEUTSCHES GEOFORSCHUNGSZENTURM GFZ—STIFTUNG DES OFFENTLICHEN RECHTS DES LANDES BRADEN TELEGRAFENBERG, Potsdam (DE)

( * ) Notice: Subject to any disclaimer, the term of this patent is extended or adjusted under 35 U.S.C. 154(b) by 0 days.

(21) Appl. No.: 16/351,917

(22) Filed: Mar. 13, 2019

(65) Prior Publication Data

US 2019/0284931 A1    Sep. 19, 2019

(30) Foreign Application Priority Data

Mar. 13, 2018   (DE) .................. 10 2018 105 703

(51) Int. Cl.
*E21B 47/005*    (2012.01)
*E21B 47/16*    (2006.01)
(Continued)

(52) U.S. Cl.
CPC ............ *E21B 47/16* (2013.01); *E21B 47/005* (2020.05); *E21B 47/113* (2020.05);
(Continued)

(58) Field of Classification Search
None
See application file for complete search history.

(56) References Cited

U.S. PATENT DOCUMENTS

2011/0199228 A1* 8/2011 Roddy .................... E21B 33/13
340/856.4
2011/0308788 A1* 12/2011 Ravi .................. G01D 5/35303
166/250.01
(Continued)

FOREIGN PATENT DOCUMENTS

DE     69816743 T2    3/2004
DE    699 27 274 T2    6/2006
(Continued)

OTHER PUBLICATIONS

Handbook of Polymer Applications in Medicine and Medical Devices, 2014 (Year: 2014).*
(Continued)

*Primary Examiner* — Curtis A Kuntz
*Assistant Examiner* — Jerold B Murphy
(74) *Attorney, Agent, or Firm* — Blue Filament Law PLLC

(57) ABSTRACT

In a first aspect, a method for monitoring a material and/or a device in a borehole using a fiber optic measurement cable is provided, and, in a second aspect, a system for carrying out the method is provided. The system includes a fiber optic measurement cable which is present introduced into a borehole, wherein a material and a device are present in the borehole.

9 Claims, 6 Drawing Sheets

(51) Int. Cl.
    *E21B 47/18*     (2012.01)
    *G02B 6/44*     (2006.01)
    *E21B 47/113*     (2012.01)
    *E21B 47/135*     (2012.01)

(52) U.S. Cl.
    CPC ............ *E21B 47/135* (2020.05); *E21B 47/18* (2013.01); *G02B 6/4463* (2013.01)

(56) References Cited

U.S. PATENT DOCUMENTS

| | | | | |
|---|---|---|---|---|
| 2012/0013893 A1* | 1/2012 | Maida | ................... | E21B 47/135 356/73.1 |
| 2014/0034301 A1* | 2/2014 | LeBlanc | ............... | E21B 47/005 166/250.14 |
| 2014/0180592 A1* | 6/2014 | Ravi | ................... | E21B 47/107 702/12 |
| 2015/0177198 A1* | 6/2015 | Thierry | ................... | E21B 33/14 166/253.1 |
| 2016/0040524 A1* | 2/2016 | Ravi | ....................... | E21B 47/10 166/253.1 |
| 2016/0266086 A1* | 9/2016 | Von Herzen | ....... | G01N 29/2481 |
| 2017/0254191 A1* | 9/2017 | Barfoot | ................. | E21B 47/113 |

FOREIGN PATENT DOCUMENTS

| | | |
|---|---|---|
| DE | 10 2009 010 289 | 9/2010 |
| DE | 198 07 891 A1 | 11/2016 |

OTHER PUBLICATIONS

Arthur H. Hartog, An Introduction to Distributed Optical Fibre Sensors, CRC Press Taylor & Francis Group, 2017, pp. C-471, Boca Raton, United States of America.

Alli Masoudi, M Belal and T P Newson, A Distributed Optical Fibre Dynamic Strain Sensor Based on Phase-OTDR, Measurement Science and Technology, IOP Publishing Ltd, 2013, U.K.

Alli Masoudi and Travor P. Newson, Contributed Review: Distributed Optical Fibre Dynamic Strain Sensing, Review of Scientific Instruments, AIP Publishing, 2016, United Kingdom.

* cited by examiner

METHOD AND SYSTEM FOR MONITORING A MATERIAL AND/OR A DEVICE IN A BORE HOLE USING A FIBER OPTIC MEASURING CABLE

In a first aspect, the invention relates to a method for monitoring a support material and/or a device in a borehole using a fiber optic measurement cable, and, in a second aspect, the invention relates to a system for carrying out the method, wherein the system comprises at least one fiber optic measurement cable which is present introduced into a borehole, wherein a material and a device are present in the borehole.

The project leading to this application received funding from the "Horizon 2020" Research and Innovation Program of the European Union under the grant agreement No. 654497 (GeoWell). It is known that some fossil fuels such as crude oil or natural gas are extracted from the ground or rock layers using boreholes. In the field of geothermal energy, in the field of drinking water extraction, in the injection of liquids, for example, for underground cleansing and pressure maintenance, in drinking water monitoring or water table monitoring, boreholes are used, without limitation to these uses. It is desirable that these boreholes exhibit great stability and that the stability of a borehole, the so-called borehole integrity, can be monitored. Commonly, for the purpose of stabilizing a borehole, cement or another curing and/or sealing material is used, which is filled into the borehole. In the process, the cementing crews working on the boreholes must ensure in particular that the cementing is tight and that no strains occur within the material. In particular, the borehole integrity must be monitored and further observed especially in natural gas and/or crude oil extraction. The integrity of a borehole is particularly important because potential contaminants can migrate. Advantageously, by using the invention, a loss income can also be avoided when the well cannot be used and possibly must be repaired, at high cost, when a defect or leak has been detected. Such defects or leaks can even lead the possible abandonment of the well. Commonly, cement is pressed behind the pipe in order to ensure a stable borehole.

In the prior art, methods and systems for fluid tracking are known, by means of which the flow behavior of a liquid support and/or sealant material can be monitored during the borehole filling process. This can involve, for example, a cement which is introduced into the borehole for the stabilization of the borehole and/or for the hydraulic sealing of same. This process is also referred to as "cement pumping," for example. However, the term can also apply to other terms such as liquids or fluids such as gas. In particular, in the prior art, methods and systems are known which make it possible to examine the boundary surfaces between different liquid materials in a borehole. In fluid tracking, acoustic measurements are carried out, by means of which signals which originate from the fluid cement itself and which are suitable for characterizing it can be captured. Thereby, material properties or special features such as gaps or bubbles in the liquid and fluid cement can be determined or detected. These material properties can relate in particular to the cement and its flow behavior.

A disadvantage of these methods and systems known from the prior art is that the properties of liquid and flowing materials can only be examined thereby during the operation of the cementing of a borehole. The known methods and systems in particular do not make it possible to draw any conclusions regarding the mechanical properties of a material, in particular the cement, at any time along the entire life cycle of the borehole. In particular, there is a need to continuously monitor the integrity of the borehole after liquid materials such as cement have been introduced into the borehole and the materials no longer flow. In addition, in addition to the material, it would be desirable to be able to monitor additional objects present in the borehole with regard to their mechanical properties.

Therefore, the aim of the present invention is to provide a system and a method which do not have the deficiencies and disadvantages of the prior art. In particular, an aim of the invention is to provide a system and a method by means of which the mechanical properties of a material and additional objects in a borehole can be monitored at any time along the entire life cycle of the borehole.

DESCRIPTION OF THE INVENTION

The aim is achieved by the features of the independent claims. Advantageous designs of the invention are described in the dependent claims.

In a first aspect, the invention relates to a method for monitoring borehole integrity by monitoring a support material introduced into the borehole and/or an introduced device using at least one fiber optic measurement cable, comprising the following steps:

a) introduction of the at least one fiber optic measurement cable into the borehole, and connecting the measurement cable to the support material and/or to the device;

b) performance of vibration and/or strain measurements within the borehole, wherein, as measurement signal, a time series of a strain and/or a strain change of at least one area of the fiber optic measurement cable is used for the determination of a strain and/or of a strain change of the support material surrounding the fiber optic measurement cable in this area and/or of the device surrounding the fiber optic measurement cable in this area;

c) analysis of strain amplitudes and/or of a strain amplitude distribution by time series comparisons for different areas and/or different times for the determination of an at least area-by-area spatially resolved and/or time resolved distribution of information on the state of the support material and/or of the device.

The monitoring of a borehole integrity preferably comprises the monitoring of a support material introduced into the borehole and/or of an introduced device. The monitoring of a borehole with regard to the integrity or the stability and/or safety of the borehole relates in particular to an introduced support material (for example, cement) or an introduced device (for example: casing). Boreholes in the ground can involve in particular a geologic formation consisting of rock, for example, into which a preferably substantially vertical hole of preferably final depth is drilled. In order to support and stabilize the hole, the casing is preferably used for lining the well, wherein preferably at least one support material is introduced between casing and rock. It is particularly advantageous that initially present empty spaces between casing and rock are filled in a homogeneous manner and substantially completely with support material and that both the device and the material comprise no unwanted inhomogeneity and/or damage. For the introduction, a support material is preferably pumped. In this text, a support material is preferably also referred to as material.

For the monitoring, at least one fiber optic measurement cable is used. In particular, it is preferable here to use a fiber optic cable or an optical glass fiber. The latter is preferably adapted to the field of application, that is to say, for example, a protective jacketing of the fiber can be present, which at the same time enables the transmission of strains and/or temperatures of the fiber surroundings in the borehole. The fiber optic measurement cable is preferably referred to as fiber in this description. Preferably, the glass fiber is protected in a cable.

The fiber optic measurement cable is introduced into the borehole and brought in connection with support material and/or with the device. In connection here can mean that there is a physical and/or mechanical contact between fiber and support material and/or the device. This contact can be generated by a firm and substantially undetachable connection, for example, in that the fiber is cast in the support material and/or sealant material for the sealing or connected by connection elements to the casing (gluing, cable connector, etc.). The term support material preferably denotes a support and/or sealant material. A support material is thus preferably a support and/or sealant material. It can also be preferable that the fiber is introduced in a hole and connected due to its own weight by positive connection to the support material and/or the device, wherein the support material and/or the device are slightly tilted with respect to a perfect vertical alignment and the fiber is thus is in contact at least in some areas. The transmission of strains can here occur by friction between fiber and support material and/or device. Preferably, the fiber can here extend substantially vertically along the borehole; however, it can also have a horizontal course with respect to the longitudinal axis of the fiber at least in some areas.

The fiber here is preferably used for carrying out vibration and/or strain measurements within the borehole. Here, vibration measurements are preferably also strain measurements which relate to a signal which changes rapidly over time and which can preferably also comprise periodic portions. Rapidly relates preferably to a rate of change of the strain. With regard to an at least partially periodic rate of change, signals having a (dominant) frequency in the range of 0.01 Hz to 2 Gigahertz (GHz) can preferably be measured. The range of 0.01 Hz to 100 MHz is particularly preferable, the range of 0.01 Hz to 10 MHz is more preferable, the range of 0.01 Hz to 1 MHz is even more preferable, the range of 0.01 Hz to 100 kHz is very preferable, in particular 0.01 Hz to 20 kilohertz (kHz); however, other preferred frequency ranges which at least partially describe the rate of change of a measurable strain are described in the present text. Preferably, a vibration measurement and/or strain measurement comprise(s) a passive acoustic measurement. A passive acoustic measurement preferably comprises an acoustic measurement using signals not generated specifically for this measurement (generated naturally or anthropogenic ally).

As measurement signal, it is preferable to use a strain and/or a strain change of at least one area of the fiber optic measurement cable. Said strain and/or strain change is preferably measured and/or recorded at regular time intervals, so that a time series of a strain and/or strain change is measured. The time intervals are preferably based on a repetition rate and/or measurement rate at which the measurement signal is collected. This rate can preferably be described by a frequency. For example, the frequency can be on the order of magnitude of 1 Hz, 10 Hz, 100 Hz, 1 kHz, 10 kHz, 100 kHz, 1 MHz, 10 MHz and/or 100 MHz. A person skilled in the art knows that there is a relationship between a measurable maximum (dominant) frequency of the measured signal and this measurement rate or sampling rate. A strain change averaged over time can here preferably be used for computing a strain. For example, the strain relative to a known reference can be measured and/or changes of the strain per time step or measurement time can be measured, wherein it is possible to derive the strain preferably by integration over time. A strain can preferably comprise an extension or expansion and/or compression or contraction. Here, the strain relates in particular to a change in the length of the fiber along its longitudinal axis. An area of the fiber optic measurement cable here preferably comprises an area of the fiber along its longitudinal axis. The fiber can preferably be subdivided into areas along the longitudinal axis, areas within which a measurement of the strain and/or strain change of the fiber, which was substantially transmitted by the device and/or the support material brought in contact with it, can be measured. Thus, for example, in a substantially vertically running fiber, said fiber can be subdivided into areas arranged vertically from top to bottom, with which a measured value and the associated depths of the area within the borehole can be associated. Preferably, there is a relationship here between the length of the areas along the fiber and the spatial resolution of the measurement, for example, the vertical or depth resolution. The measurement value, which is present in particular in the form of a time series, is then preferably used for the determination of a strain and/or of a strain change of the support material surrounding the fiber optic measurement cable in this area and/or of the device surrounding the fiber optic measurement cable in this area. Here, the surrounding areas preferably relate to areas arranged in radial direction around the areas of the fiber around the longitudinal axis of the fiber. In particular, a strain and/or a strain change of the areas directly adjoining the fiber is determined here. By means of said strain and/or strain change, preferably the strain and/or a strain change in areas farther removed radially from the fiber can also be determined. These areas preferably relate to the areas of the borehole which are arranged radially along the longitudinal axis of the fiber. Here, an area can relate the surface of the material and/or of the device and the fiber, which is in contact and/or in connection in radial direction. However, an area can also extend in radial direction within a radius around the fiber, the radius measuring, for example, 1 centimeter (cm), 10 cm, 1 meter (m), 10 m and/or 100 m. The entire captured area of the device and/or of the support material here preferably has a substantially cylindrical shape with a height which corresponds substantially to the area of the fiber and with a radius as described above. Preferably, areas of several layers (cement/casing) are also determined. If the measurement cable (the fiber) is connected to the support material, for example, the area can also comprise the device which accordingly can be measured (preferably together with the support material) and vice versa. Preferably, the fiber is arranged vertically and a measurement comprises primarily measurements points or areas arranged vertically (along the fiber). On the other hand, an installation of the fiber in horizontal direction or in a helicoid arrangement (preferably a mixture of vertical and horizontal components of the longitudinal arrangement of the fiber) can also be preferable. Here, it is preferable to measure corresponding areas of the device and/or of the material which are arranged as described along the longitudinal axis of the fiber. Although a value is preferably measure locally on the fiber (in an area), this value is, however, influenced in particular by the coupling of the different layers in a borehole (casings and/or support material). Therefore, an integral measurement is preferable, wherein the farther removed layers preferably have less influence on the measurement signal. Preferably, in the areas surrounding the fibers, the measurements can also be carried out with radial (relative to the preferably substantially cylindrical longitudinal axis of the borehole) spatial resolution, for example, by combination differently arranged fibers for measure method.

Terms such as substantially, roughly, about, approximately, etc., preferably describe a tolerance range of less than ±40%, preferably less than ±20%, particularly preferably less than ±10%, even more preferably less than ±5%, and in particular less than ±1%. "Similar" preferably describes sizes that are roughly the same. Partially preferably describes at least 5%, particularly preferably at least 10%, and in particular at least 20%, in some cases at least 40%.

In an additional step of the method, the measured strain amplitudes and/or strain amplitude distributions are analyzed preferably by a comparison of time series for different areas and/or different times. Here, times series, measured at the same time or at different times, from different areas (of the fiber) can be compared to one another. Time series of the same areas can also be measured at different times. Here, compared time series preferably comprise a substantially identical number of temporal measurement points. When time series of different time points are compared, preferably finite time series with temporal measurement points around and/or including the time point are averaged here. Preferably, as a result of differences in the compared measurement signals which can relate, for example, to amplitudes, frequencies, etc., here, at least in some areas, a spatially resolved and/or temporally resolved distribution of information on the state of the support material and/or of the device can be determined.

Information on the state here comprises preferably information on homogeneity, coupling, for example, between support material and rock or casing, damage, stability, fatigue and/or elasticity of the support material and/or of the device. An analysis of strain amplitudes and/or of a strain amplitude distribution can here comprise a further mathematical and/or electronic processing of the measurement data, comprising, for example, a Fourier transform, spectral filtering and/or temporal filtering. A distribution here designates in particular a spatial and/or temporal distribution. This means in particular here that the information on the state of the support material and/or the device can be measured with spatial and/or temporal resolution as a function of the measurement resolution.

By means of the method, using simple and robust configuration for the strain measurement, comprehensive findings on the state of a borehole can be acquired.

In a preferred embodiment of the invention, as distribution of information on the state, a distribution of information on an acoustic impedance and/or on a mechanical coupling of support material, device and/or borehole surroundings is used in order to determine areas in the borehole where there is an increased probability of occurrence of material fatigue of the support material and/or of the device. It has been shown that the acoustic impedance and/or mechanical coupling is particularly suitable for such a measurement, making it possible to reach comprehensive conclusions.

In another preferred embodiment of the invention, the information on mechanical coupling is determined by a comparison of strain amplitudes of different areas and/or times, wherein, a comparatively higher strain amplitude means a lower mechanical coupling and/or increased material fatigue. In particular, if a sound source and/or the origin of a strain within the borehole comprising support material and/or device is present, a comparatively higher amplitude preferably indicates an unsatisfactory coupling of a determined area of the support material or device to the surroundings, since, thereby, a strain or acoustic pressure waves can be coupled only to a reduced extent mechanically to said surroundings. Thus, areas which exhibit poor coupling with respect to other areas and/or in comparison to previous times can be determined. This can advantageously indicate fatigue, inhomogeneities and/or instabilities. When a sound source and/or the origin of a strain is present outside of the borehole comprising the support material and/or device, it is also preferable that a comparatively higher amplitude preferably indicates an unsatisfactory coupling of a determined area of support material or device to the surroundings. This is the result, for example, of the fact that a poor mechanical coupling allows a greater oscillation of the system.

In an additional preferred embodiment of the invention, the information on the acoustic impedance and/or on mechanical coupling is determined by comparison of measured strain amplitudes of different areas and/or times with a reference measurement. The term reference measurement preferably covers one or more measurements in which a plurality of conditions under which the measurement has taken place is known and/or the measured physical variables are also known. Therefore, these measurements, for example, as calibration method, can be used for the measurement method. Reference measurements can also be based on other measurement methods and/or comprise theoretical computations. Thus, for example, by means of one or more reference measurements, an absolute value of an acoustic impedance of an area of a fiber surrounding can also be measured. This can be spatially resolved preferably not only along the fiber areas, but also radially (with respect to the longitudinal axis of the borehole) for example by a combination of differently arranged fibers for the measurement method.

In an additional preferred embodiment of the invention, the vibration and/or strain measurements comprise spatially distributed strain measurements.

Spatially distributed strain measurements are preferably also known under the English term Distributed Strain Sensing (DSS). When the sampling rate of the measurement is preferably high enough to be able to capture seismic or acoustic signals, the measurement method is preferably also referred to as spatially distributed acoustic measurement (English: distributed acoustic sensing—DAS) or spatially distributed vibration measurement (English: distributed vibration sensing—DVS). The underlying measurement principle here as a rule is the measurement of phase changes of the backscattered light along a glass fiber.

In an additional preferred embodiment of the invention, an arrangement of the fiber optic measurement cable in longitudinal direction along the borehole is carried out, and the strain and/or strain change cover(s) vertical areas of the fiber optic measurement cable. Thereby, the implementation of the method and an evaluation are particularly simplified.

In an additional preferred embodiment of the invention, the fiber optic measurement cable is arranged in a support material in the borehole.

In an additional preferred embodiment of the invention, the fiber optic measurement cable is lowered into the borehole and/or used in connection with a casing in the borehole. In an additional preferred embodiment of the invention, the support material comprises a material which cures and/or which seals the borehole, in particular cement, wherein the measurements are carried out preferably during and/or after a curing of the support material.

Thus, during a measurement, advantageously both a borehole which has been completed and is ready for extraction and/or which is in use, and a temporal sequence during the preparation of the well/borehole can be monitored.

In an additional preferred embodiment of the invention, the device comprises the casing in the borehole and/or a drill string.

In another preferred embodiment of the invention, the measurement cable is introduced permanently or temporarily in the borehole.

In another aspect, the invention relates to a system for carrying out the method described here, wherein the system comprises a fiber optic measurement cable which is present introduced into a borehole, wherein in the borehole, an introduced support material and an introduced device are present, wherein the fiber optic measurement cable is configured to determine strain information with regard to the support material and/or device by means of vibration and/or strain measurements, preferably by means of spatially distributed strain measurements.

The average person skilled in the ar knows that technical features, definitions and advantages of preferred embodiments of the method according to the invention also apply to the system according to the invention.

In a preferred embodiment of the invention, the system comprises a computation unit for the analysis of strain amplitudes and/or a strain amplitude distribution. The analysis step of the featured monitoring method can preferably be carried out by means of the computation unit. A computation unit preferably comprises at least one computer or at least one digital logic circuit which is suitable for executing algorithms and/or computation steps, for example, a microprocessor.

In an additional preferred embodiment of the invention, the system moreover comprises a strain measurement device and/or a strain change measurement device for processing the strain information.

In an additional preferred embodiment of the invention, the system comprises a centralizer for centering a casing in the borehole.

In an aspect, the invention relates to a method for monitoring a material and/or a device in a borehole using at least one fiber optic measurement cable, which comprises the following steps:

a) introduction of the at least one fiber optic measurement cable into a borehole b) performance of passive acoustic measurements within the borehole, wherein, as measurement signal, a strain and/or a strain change of the material and/or of the device is/are used c) analysis of strain amplitudes and/or of a strain amplitude distribution for the determination of a distribution of an acoustic impedance within the material and/or the device, wherein the measurements occur after the completion of a pumping of the material.

The average person skilled in the art recognizes that technical features, definitions and advantages of preferred embodiments of the method according to the invention in accordance with this aspect also apply to the above-described method according to the invention and the above system according to the invention.

Surprisingly, by the combination of the method steps of the proposed method, a monitoring of the borehole integrity at any time along the entire life cycle of the borehole can be achieved. For the purpose of the invention, the term "entire life cycle of a borehole" preferably denotes the time span from the switching off of the pumps by means of which the cement or other sealing material is pumped into the borehole, that is to say preferably the time when the cement is no longer fluid, until the time when the well is abandoned and decommissioned. Preferably, this is made possible in that the fiber optic measurement cable is present arranged in the borehole and is used for carrying out passive acoustic measurements within the borehole. The fiber optic measurement cable can be a glass fiber cable, for example. For the purpose of the invention, it is preferable that the proposed system can comprise one or more measurement cables. During the use of one fiber optic measurement cable, 1-D information with respect to an axis of the borehole is preferably obtained. During the use of two or more measurement cables, it is possible to obtain 2-D information around the borehole axis. In particular, it is preferable to increase the spatial resolution within a depth in the borehole. The inventors have recognized in particular that strain amplitudes and/or a strain amplitude distribution can be used in order to determine a distribution of an acoustic impedance within the material and/or the device. For the purpose of the invention, it can also be preferable to determine, by the analysis of the strain data, the coupling of different borehole components to the borehole wall and/or the surrounding rock. For the purpose of the invention, it is preferable that the distribution of the acoustic impedance and/or of the coupling of the materials to one another is/are analyzed. It can also be preferable to study and/or analyze the resonance frequencies of individual components. It is preferable to evaluate signals which a fluid or another noise source in the surroundings of the borehole generates inside and/or outside the borehole, in order to be able to determine the mechanical properties of the material and/or of the device. Noise sources can also be, for example, vehicles, waves, wind or earthquakes. In contrast to the fluid tracking methods in the context of the proposed method, in the proposed method it is not the medium itself that is measured, but another medium in order to obtain information on the nonfluid cement or the borehole components. The fluid can be selected, for example, from a group comprising gas, water and/or oil. For the purpose of the invention, the fluids can preferably be formation fluids, suspensions, emulsions, mixtures of fluids, mixtures of a fluid with a solid, mixtures of a fluid with a gas, mixtures of a gas with a solid and/or cement which is used for cementing a section of the well, without being limited to these fluids. Preferably, any moving medium in the borehole can be used for the measurements. Here, the measurements carried out on the medium are preferably used not to characterize the medium itself, as in fluid tracking, but to characterize the other borehole components.

The passive acoustic measurements are carried out in particular after completion of a pumping of the material, for example, of the cement, for example, after the curing of the material. The term "after the curing" preferably also covers the time span after the end of the pumping during which the cement is possibly still liquid. Thereby, the mechanical properties of solid materials are thus preferably studied. For the purpose of the invention, the term "after the curing of the material" preferably means "after completion of the pumping process" or "when the medium which is used for the completion is longer fluid." Tests have shown that, using the proposed method, it is surprisingly also possible to observe that "curing," that is to say hydration of the cement, which is preferably associated with a change of the mechanical properties.

By means of the proposed method, in particular a long-term observation of a borehole with regard to its integrity is possible thereby. This is made possible in particular in that a temporal change of the connection of the cement to the casing, that is to say a temporal change of the elastic properties of the cement in the annular space, can be determined. For the purpose of the invention, it can also be preferable to use, instead of or in addition to cement, another curing and/or sealing material to be filled into the borehole in order to stabilize it. For the purpose of the invention, it is particularly preferable if the cement or the additional curing and/or sealing material is filled into an annular space between casing and rock mass, rock and/or formation. For the purpose of the invention it is particularly preferable that, by means of the invention, the stability of the borehole and a hydraulic separation of different rock layers can be achieved.

In particular, in the context of the proposed method, a measurement cable is incorporated in a well or a borehole, and an acoustic and/or seismic noise amplitude is measured. For the purpose of the invention, the term "acoustic" refers to the designation "spatially distributed acoustic measurements." For the purpose of the invention, it is preferable that in particular acoustic and/or seismic measurements are carried out, wherein the proposed method is based in particular on a strain measurement along the measurement cable, preferably "spatially distributed strain measurements." The measurement signal of the acoustic and/or seismic measurements relates to strains and/or strain changes of the material and/or the device. Advantageously, the integration over time enables the determination of strain values based on the measured strains and/or strain changes. When strain changes are used as measurement signal, it is preferable, for the purpose of the invention, to use a strain change amplitude and/or a strain change amplitude distribution for the determination of a distribution of an acoustic impedance within the material and/or the device, as well as, for example, also for the determination of a distribution of a material coupling or of resonance frequencies. When strain changes are used as measurement signal, it is moreover preferable that the strain changes yield a temporally integrated strain signal.

For the purpose of the invention, it is preferable that a strain amplitude is measured in a frequency range of a static deformation at 0 Hz into the ultrasound range.

By the analysis of the strain amplitudes, strain amplitude distribution, strain change amplitude and/or strain change amplitude distribution, a mechanical coupling of different borehole components and the borehole wall can preferably also be determined. For the purpose of the invention, the term "borehole components" preferably designates one or more casings and/or one or more cement layers within the borehole. For the purpose of the invention, it is preferable, in the proposed method, to use a centralizer formed by a centering basket, for example. The centralizer is preferably configured to center a casing in the borehole. The introduction of the centralizer preferably occurs before the filling with the cement, which is advantageously facilitated by the use of a centralizer.

Moreover, for the purpose of the invention, it is preferable that static and/or quasi-static signals are evaluated. For the purpose of the invention, the term "static" preferably denotes measurements which are carried out at a frequency of 0 Hz. The term "quasi-static" denotes measurements at very low frequencies close to 0 Hz.

The noise amplitude is generated by a fluid flow in the well, by drilling activities in the borehole and/or by anthropogenic or natural ground tremors. For the purpose of the invention, it is particularly preferable to study ground movements, i.e., preferably an anthropogenic or natural ground tremor (ambient noise). For the purpose of the invention, it is preferable that pulse-like and/or noise-like signals are evaluated.

In particular, preferably spatially distributed acoustic measurements are carried out, by which strain information on the studied objects can be obtained. For the purpose of the invention, it is particularly preferable to carry out spatially distributed strain measurements and evaluate them in an acoustically and/or seismically relevant frequency range. Here, in the context of the proposed method, it is preferable to analyze noise amplitudes, particularly mean noise amplitudes, at the seismic and/or acoustic frequencies. In addition, by means of the proposed method, resonance frequencies can be evaluated which, for the purpose of the invention, are also preferably referred to as characteristic frequencies. For the purpose of the invention, it can also be preferable to study quasi-statistic deformations, in particular for period durations in the range of minutes, hours and/or days, without being limited thereto. For this purpose it is possible, for example, to evaluate actual amplitudes of the individual measurement, in order to determine a load on the cement and/or the casing. It has been shown that, with increasing depth of the borehole, the amplitude distribution is dependent on, among other factors, the acoustic impedance of the material or of the cement in the borehole, preferably cement in the cured state. Preferably, using the proposed method, a mechanical coupling of individual components of the completion to one another and/or to the formation can be studied. For the purpose of the invention, the term "cured" is understood to mean in particular the time after the completion of the pumping. For the purpose of the invention, it is preferable to determine a relative distribution of the acoustic impedance and/or of the mechanical coupling over the measurement distance, i.e., preferably along the course of the measurement cable. For this purpose, the measurement cable can be present preferably incorporated directly in the material or it can be introduced subsequently into the borehole. This can occur, for example, in that the measurement cable is lowered into the borehole or installed on the tubing. Application tests have shown that, by means of the proposed method, a monitoring of annular spaces located farther outside is also possible, in particular when a suitable in situ calibration is carried out. For the purpose of the invention, it is preferable that such an in situ calibration represents an optional method step in the proposed method. For the purpose of the invention, it is particularly preferable to monitor different annular spaces at the same time. This can occur, for example, from inside to inside, but also from outside to inside.

With the proposed method, the inventors have found a possibility of listening to natural noises, wherein the noise amplitude correlates advantageously with any weak sites or changes of material properties within the borehole. Thus, the invention represents a substantial deviation from the prior art, in which it has been assumed to date that, for example, the ambient noise represents an interference factor in acoustic measurements. However, in the context of the present method, ambient signals are exploited intentionally and used by the passive acoustic measurements in order to be able to study the mechanical and/or elastic behavior of the material or devices in the borehole and draw conclusions regarding any stability weak sites or spatial and/or temporal changes of material properties within the borehole. In conventional methods known in the prior art, the data captured is as a rule evaluated with regard to the fluid properties of the flowing medium. In the context of the invention, on the other hand, it is preferable to exploit the noise generated by the flowing medium to be able to draw a conclusion as to the borehole completion.

In this regard, the invention relates in particular to a concrete and special application of fiber optic spatially distributed acoustic measurements for evaluating the integrity of a borehole, wherein the measurements occur in particular after the curing of a material such as cement, for example, which can be introduced into a borehole for increasing the stability and for hydraulic sealing. Deviating from the prior art, a signal generated by a liquid and flowing material or a fluid is not used here in order to be able to obtain information on the liquid and flowing material and/or the fluid itself, but instead the results of the passive acoustic or seismic strain measurements are used in order to be able to obtain information on the state of the borehole at a later time, in particular after the installation and until the abandonment of the well. For the purpose of the invention, it is particularly preferable that the noise of the flowing medium is used to obtain information on the "static" completion. Furthermore, by means of the proposed method, material properties of borehole components can be studied. Thereby, advantageously, an estimation of dynamic and/or static loading scenarios is made possible, as is a real-time analysis of the material and/or device integrity over preferably the entire life cycle of a well or a well field. A particular advantage of the proposed method consists in that it can be carried out in a destruction-free and non-invasive manner. For the purpose of the invention, it is preferable that the proposed system can also be used to monitor different types of anthropogenic underground structures such as, for example, tunnels or shafts. In addition, the proposed method makes it possible to hydraulically isolate and/or seal with respect to one another different geological formations, horizons and/or layers with different fluids and/or pressures or different components of the borehole, such as, for example, a casing, a borehole wall and/or different casings and also to prevent undesired migration of fluids along the underground well.

Listening to or measuring the natural noise is preferably achieved in that the proposed method is entirely passive in the sense that, preferably, no active signal excitation is necessary. The usable source signals can be selected from a group comprising vibration of a drill string, rotation of a drill string, fluid flow, migration of a fluid in the bore, ambient noise, artificial sources, thermal load on borehole components, thermal expansion of borehole components, pressure changes in the borehole, pressure changes in the surrounding rock, weight changes and/or changes of the load on the borehole from the surface. The source signals of the thermal load on borehole components, the thermal expansion of borehole components, pressure changes in the borehole or the pressure changes in surrounding rock are preferably evaluated in particular in the context of the quasi-static deformations which are based on preferably absolute amplitudes of the individual measurements. Ambient noise can be, for example, wind, anthropogenic activities and/or waves, without being limited thereto. Artificial sources are, for example, explosions or vibroseis applications; changes in the load on the well, for example, by working on the drilling rig. The analysis and/or the evaluation of natural noise makes it possible to draw conclusions in the light of the information obtained, which advantageously lead to prevention of material fatigue and to an increased stability of the borehole. This results in a reduced risk for all persons working in the surroundings of the borehole. In addition to risks for humans, advantageously the risk for the environment can also be minimized by means of the proposed method. In particular, by the application of the proposed method, a reduction of borehole damage, a reduction of repair costs, and a reduction of well failure can be achieved.

For the purpose of the invention, it is most particularly preferable that the material comprises cement, or that the material consists partially, mainly or substantially entirely of cement. For the purpose of the invention, it can also be preferable to use another curing and/or sealing material. Preferably, at the time of the measurements, the material is in the cured state. Preferably, the medium to be analyzed itself is not flowing. Furthermore, for the purpose of the invention it is preferable that the device is formed by the casing in the borehole and/or a drill string. By means of the proposed method, preferably passive acoustic signals are evaluated, in order to analyze mechanical properties of the preferably static structure of a borehole with its different possible subcomponents such as casings and/or different cement layers, wherein, in the context of the proposed methods, the measurements are carried out in particular after the curing of the material, in particular of the cement. For the purpose of the invention, it is particularly preferable if the acoustic measurements are strain measurements in the measurement cable, which advantageously make it possible to determine the mechanical properties of the components in the borehole. It is particularly preferable for the measurements to be carried out with very high frequencies of the laser beam, wherein, for the purpose of the invention, it is particularly preferable that strain signals having a frequency in a preferred range of $f1 \ll 1$ Hz and $f2 > 1$ kHz are evaluated by the method. For the purpose of the invention, it is also preferable to carry out measurements in a frequency range of 1-250 Hz. With respect to an at least partially periodic rate of change, preferably signals having a (dominant) frequency in the range of 0.01 Hz to 2 Gigahertz (GHz) are measured. It is particularly preferable to use the range of 0.01 Hz to 100 MHz, more preferably 0.01 Hz to 10 MHz, even more preferably 0.01 Hz to 1 MHz, very preferably 0.01 Hz to 100 kHz and in particular 0.01 Hz to 20 kilohertz (kHz). Passive acoustic measurements in the mentioned frequency range have been found to be particularly suitable in order to be able to identify in a particularly reliable manner and beforehand areas of the borehole where material fatigue can occur. It is preferable that, in the proposed method, to use a measurement instrument which is preferably configured to measure strain data along the measurement cable. For this purpose, preferably laser pulses and/or laser frequency sweeps can be used, without being limited thereto.

For the purpose of the invention, it is preferable that the distribution of an acoustic impedance and/or the mechanic coupling of borehole components is/are used in order to determine areas in the borehole where there is an increased probability of an occurrence of material fatigue. For the purpose of the invention, it is preferable for the term "impedance" to mean the sum of all the resistances capable of counteracting a propagation of oscillations or, in the seismic sense, to mean the product of wave speed and material density. Furthermore, it can be preferable that the method comprises a localization of areas in which there is an increased probability of a good hydraulic sealing. The proposed method can preferably also be used to quantify cement bonding along the borehole.

Preferably, in particular the mean noise amplitudes are evaluated in order to determine in which depth ranges in the borehole mechanical stresses of the material and/or of the device are present, which can possibly lead to problems with regard to the integrity of the borehole. For the purpose of the invention, it is also preferable to determine sites which were produced defectively, for example, or which develop a defect. This can be indicated, for example, in that unusual strains and/or vibrations in the material and/or in connection with the device are determined. For example, in areas with increased vibration, the mechanical coupling between the material and the device can be decreased. If the material is, for example, cement, and the device is the casing within the borehole, then, for example, the contact between cement and casing in the determined range of the unusual vibration can be decreased. It has been shown that the coupling depends on the mechanical properties of the material and/or of the device, wherefore the mechanical properties can be used as indicator of the coupling quality. For the purpose of the invention, it is preferable that a superposition of impedance and coupling determines the noise amplitude and/or characteristic frequencies. The mechanical properties are in particular the strain of the material and/or of the device, which can be determined by the acoustic measurements carried out in the context of the proposed method. For the purpose of the invention, it is preferable to use the term "acoustic measurement" preferably for strain measurements in a frequency range from 0 Hz into the ultrasound range. The evaluation of the mean noise amplitudes can be carried out, for example, by determining a root mean square (RMS) value from measurement series having a duration of 1 min, wherein the measurement duration preferably can also be longer or shorter. For so-called "impact" signals such as, for example, earthquakes, a measurement duration of only a few seconds can be preferable.

The measurements occur after the completion of a pumping of the material, wherein the measurement cables for carrying out the acoustic measurements are preferably present introduced permanently or temporarily in the borehole. For the purpose of the invention, it is preferable that a permanent installation of the measurement cable within the borehole takes place, in particular when the mechanical properties of the material, in particular of the cement, are to be studied. For this purpose, the fiber optic measurement cable can preferably be present arranged in the borehole, wherein it is present in particular permanently in the borehole. Furthermore, it is preferable that the measurement cable is incorporated in axial direction in the well. It can also be preferable that multiple measurement cables are arranged distributed around a borehole axis. It is particularly preferable for the mechanical properties of the cement behind the casing in a borehole to be determined by means of fiber optic spatially distributed strain measurements. For this purpose, preferably, a fiber optic measurement cable is incorporated permanently in a well and used to record spatially distributed strain measurements. Thereby, in particular the static deformation and/or dynamic deformation of the material and/or of the device is/are used in order to determine the connection of the material to the device. Preferably, the determination of a strain of the material and/or of the device in the context of the present invention comprises the capturing of static and/or dynamic deformations of the material and/or of the device. Thereby, a dynamic load measurement in a spatially distributed manner is advantageously possible. In particular, the connection of a pumped cement to the casing in a borehole as well as its material properties can be determined with the preferably spatially distributed strain measurements. In this manner, it is advantageously possible to identify areas in the borehole in which an increased probability of material fatigue exists.

For the purpose of the invention, it is moreover preferable to determine the elasticity of the material, in particular of the cement, in different annular spaces within the borehole. For the purpose of the invention, the term "annular space" is preferably used synonymously with the term "annular gap" and preferably denotes the space in a borehole behind the casing. Preferably, the elasticity of the material, of the casing and/or of an additional borehole component is defined by the physical variables of the E modulus and/or of the Young's modulus. For the purpose of the invention, it is preferable that the elasticity of the material is determined via an analysis of the amplitude spectrum at different depths within the borehole. For the purpose of the invention, it is preferable that, in the context of the proposed method, static measurements at a frequency of substantially 0 Hz are carried out, and/or dynamic measurements are carried out at a certain frequency. For the purpose of the invention, it is preferable that the dynamic measurements comprise the determination of a root mean square (RMS) value, while, in the static measurements, an actual amplitude of individual measurements is preferably evaluated.

A particular merit of the invention consists in that passive acoustic measurements within the borehole are carried out in order to determine a strain of the material and/or the device. For the purpose of the invention, it is preferable that the term "passive" relates to the generation of the acoustic signal and not to a sampling and/or reading out of the measurement cable. Preferably, in the context of the proposed method, in particular laser pulses are used to sample the acoustic signal. It was completely surprising that, with the proposed steps, a method for monitoring a material and/or a device in a borehole can be provided, which can be carried out without the need for an active source signal. For the purpose of the invention, the term "passive" preferably means "without the use of an active source signal" or "using the natural noise."

For the purpose of the invention, it can also be preferable that, for performing the acoustic measurements, the measurement cable is present introduced preferably temporarily in the borehole. For example, this can be achieved in that the fiber optic measurement cable is lowered into the borehole and/or used in connection with a (preferably temporary) casing in the borehole. For the purpose of the invention, it is preferable that the measurement cable is incorporated in axial direction in a well. Preferably, the fiber optic measurement cable is introduced temporarily in the borehole, wherein the measurement cable is configured in particular to record spatially distributed strain measurements. For the purpose of the invention, it is particularly preferable that the spatially distributed strain measurements are carried out along the measurement cable.

Preferably, the acoustic measurements carried out in the context of the proposed method are performed at different depths in the borehole. This is particularly advantageous in order to obtain a particularly good spatial resolution of the passive acoustic measurements. For the purpose of the invention, the passive acoustic measurements, which are preferably strain measurements, are in particular spatially distributed, wherein the connection of the cement to the casing within the borehole and the elasticity of the cement in particular in the annular spaces are measured. Preferably, the cement and/or the sealing material is/are located in particular in the annular space of the borehole. However, it can also be preferable to fill a well with the material and/or the cement in the interior. Tests have shown that advantageously such filling materials can be monitored with the proposed method. For the purpose of the invention, it is particularly preferable that the elasticity and/or the deformation can also be determined for other borehole components.

For the purpose of the invention, it is particularly preferable that a processing of the strain information comprises a filtering, an analysis and/or a recording of the strain information. For the purpose of the invention, it is preferable that, with regard to the mechanical properties of the cement, temporary and permanent measurement scan be carried out, wherein the term "temporary measurement" preferably means that the measurement cable is lowered into a borehole, and the term "permanent measurement" preferably means that the measurement cable is incorporated permanently in the borehole, for example, in that it is embedded in the material of which the mechanical properties are to be studied. Furthermore, it is preferable that the proposed method, with regard to the casing, can be understood as method for measuring mechanical properties of borehole casings, wherein fiber optic-based strain measurements can be carried out without the need for an active source signal. In this embodiment of the invention, it is preferable that a fiber optic measurement cable is firmly installed permanently along a casing by means of appropriate cable clamps. Here, the casing can be present preferably cemented or uncemented. Furthermore, in this embodiment of the invention, it is preferable that elastic properties of the casing as well as their temporal change can be detected. Advantageously, material fatigue and/or fatigue fractures in the casing can thus be detected. In particular, dynamic strain data recorded at frequencies of $f \gg 1$ Hz is exploited to be able to determine elastic properties of the cement behind the casing in multiple annular spaces as well. Preferably, both low-frequency signals and high-frequency strain signals can be used for the analysis, in particular in order to determine mean and maximum deformations. For the purpose of the invention, the term "low-frequency" is understood to denote frequencies of $f \ll 1$ Hz, while the term "high-frequency" preferably is understood to denote frequencies of $f > 1$ kHz.

In addition, with regard to the drill string, the invention preferably relates to a method for measuring the dynamic load of a drill string during the drilling process, wherein, preferably, fiber optic strain measurements of a permanently installed cable are carried out behind the casing in the preceding pipe section. In this embodiment of the invention, it is preferable that a fiber optic measurement cable is used for this purpose, in order to record preferably spatially distributed strain measurements, in particular a dynamic deformation, which can advantageously be used to determine the characteristic resonance frequencies of a drill string during the drilling process. Here, this can involve, in particular, the harmonic resonance frequencies of the drill string. In this embodiment of the invention as well, it is preferable that a fiber optic measurement cable is firmly installed permanently along a casing by means of appropriate cable clamps, wherein the casing can be present preferably cemented or uncemented.

In this embodiment of the invention, it is preferable that the data recorded with the help of the fiber optic strain measurement device can be processed, filtered and/or analyzed, in order to determine local strain information along the cable. For the purpose of the invention, it is particularly preferable that a strain measurement device is formed by one or more measurement cables, wherein the measurement cable is connected preferably to a measurement instrument for the determination of fiber optic spatially distributed strain measurements, i.e., for the purpose of the invention, "acoustic measurements." In particular, passive acoustic measurements are carried out, wherein the signal is preferably produced and/or generated by vibration of a drill string, rotation of a drill string and/or friction of pipe connectors. It is preferable that the frequency spectrum of the recorded signal is used to measure resonance frequencies and/or resonance amplitudes in the drill string. In particular, a temporal change of the elastic properties can also be detected. Preferably, in the context of this embodiment of the invention, material fatigue and/or fatigue fractures in the drill string and on pipe connectors are detected. For the purpose of the invention, it is preferable that the dynamic strain data is used in order to determine the elastic properties of the drill string. Here, the dynamic strain data is determined in particular at frequencies of $f > 1$ Hz.

In an embodiment of the invention, it is preferable that the data determined preferably with the fiber optic-based strain measurement device is processed, filtered and analyzed, in order to determine local strain information of the material and/or of the device. This strain information can relate in particular to the strain of the material and/or of the device or to strain changes of same. The processing of the data preferably enables an evaluation with the goal of identifying areas within the borehole where there is an increased probability of the occurrence of a material fatigue. For the purpose of the invention, it is particularly preferable that local strain amplitudes are used in order to quantify strains in the material surrounding the cable. Furthermore, it is preferable that the strain information is used in order to compute, with the help of Hook's law, elastic and/or mechanical properties of the material and/or of the device in the borehole. By means of the proposed method and the proposed system, it is preferably possible to detect the connection of the cement to the casing as well as the elastic and/or mechanical properties of the cement in an annular space. Advantageously, the proposed method also makes it possible to draw conclusions regarding the casing.

For the purpose of the invention, it is particularly preferable that the temporal change of the connection of the cement to the casing as well as the elastic properties of the cement in the annular space can be detected. Such a temporal change of the connection of the cement to the casing and the elastic and/or mechanical properties of the cement can in particular also be detected in multiple annular spaces of a well. Preferably, by means of the proposed method and the proposed system, material fatigue and/or fatigue fractures in the cement can be detected. Here, preferably, areas with increased risk of material fatigue and/or fatigue fractures in multiple layers of the cement can be identified. For the purpose of the invention, it is particularly preferable that both low-frequency signals at preferably $f \ll 1$ Hz and also high-frequency strain signals at $f > 1$ kHz can be used for the analysis of the data obtained preferably with the passive acoustic measurements, in particular in order to determine mean and/or maximum deformations within the borehole.

In another aspect, the invention relates to a system for carrying out the proposed method, wherein the system comprises a fiber optic measurement cable which is present introduced into a borehole, wherein, in the borehole, a material and a device are present. Here, the device can preferably comprise a drill string and/or a casing and/or the cement material. The system is characterized in that the fiber optic measurement cable is configured to determine, by means of passive acoustic measurements, strain information on the material and/or the device after curing of the material. The definitions, technical effects and advantages described for the method apply similarly to the proposed system.

The average person skilled in the art recognizes that technical features, definitions and advantages of preferred embodiments of the described method according to the invention and of the above-described system also apply to the system according to the invention which is described here.

For the purpose of the invention, it is preferable that the system comprises a strain measurement device or processing the strain information. Preferably, a fiber optic strain measurement device can be connected to the measurement cable, in order to record the preferably spatially distributed strain information which can preferably also comprise strain changes.

For the purpose of the invention, it is preferable that the system comprises a device for generating the laser pulses used in the context of the proposed method in order to sample an acoustic signal. For the purpose of the invention, the term "to sample an acoustic signal" is preferably used synonymously for the determination of the deformation of the at least one measurement cable. In addition, it is preferable that the proposed system comprises a device for detecting and/or processing the signals obtained during the reading out of the measurement cable.

For the purpose of the invention, it is particularly preferable that the system comprises a centralizer for centering a casing in the borehole. Preferably, this centralizer, which represents an optional component of the system, is formed by a centering basket.

DETAILED DESCRIPTION

Below, the invention will be explained in further detail in reference to examples, without being limited to said examples.

EXPERIMENTAL SETUP AND SEQUENCE

An application example for the method is indicated in publication [1]. In this application example, a fiber optic measurement cable was incorporated together with a 355 m, 18⅝" (inch), long surface casing string or casing of a commercial geothermal well has been incorporated. The measurement cable was fastened by means of a strapping device to the casing string or casing. After the incorporation of the casing string, the annular space between casing string and rock mass or rock or a farther outward lying casing string was filled with cement as support material, or cement was pressed into the annular space, so that the annular space was filled with cement over the entire length. In the process, the measurement cable was engulfed completely by cement and mechanically coupled to or brought in connection with the cement by the curing.

After the installation of the surface casing string, the next section was drilled to a depth (preferred term for depth in mining) of 1019 m and lined with a 13⅜" production casing string or production casing. The annular space behind the 13⅜" casing string was again filled with cement over the entire length. In an additional section, the reservoir interval was drilled with a 12¼" drill bit.

Along the measurement cable, during the drilling work at a depth of −2200 m, strain data spatially distributed along the fiber optic measurement cable was recorded. In addition, strain data was determined both during an injection test and during the time of a complete well containment.

Measurement Method

Along the fiber optic measurement cable, spatially distributed strain measurements (English: distributed strain sensing—DSS) were carried out. When the sampling rate is high enough to be able to capture seismic or acoustic signals, the measurement method is also frequently referred to as spatially distributed acoustic measurement (English: distributed acoustic sensing—DAS) or spatially distributed vibration measurement (English: distributed vibration sensing—DVS). The underlying measurement principle here is as a rule the measurement of phase changes of the backscattered light along a glass fiber [2]. If one considers two scattering centers separated from one another in a glass fiber, then, for example, by means of a Mach-Zehnder interferometer, the phase difference of backscattered light of these scattering centers can be determined. If the distance between these scattering centers then changes between successive laser pulses, due to strain or compression of the fiber, this also changes the phase difference of the backscattered light. These and other fiber optic strain measurement methods have been described in detail in the literature, for example, in [3] and [4].

Results

Figure 1:
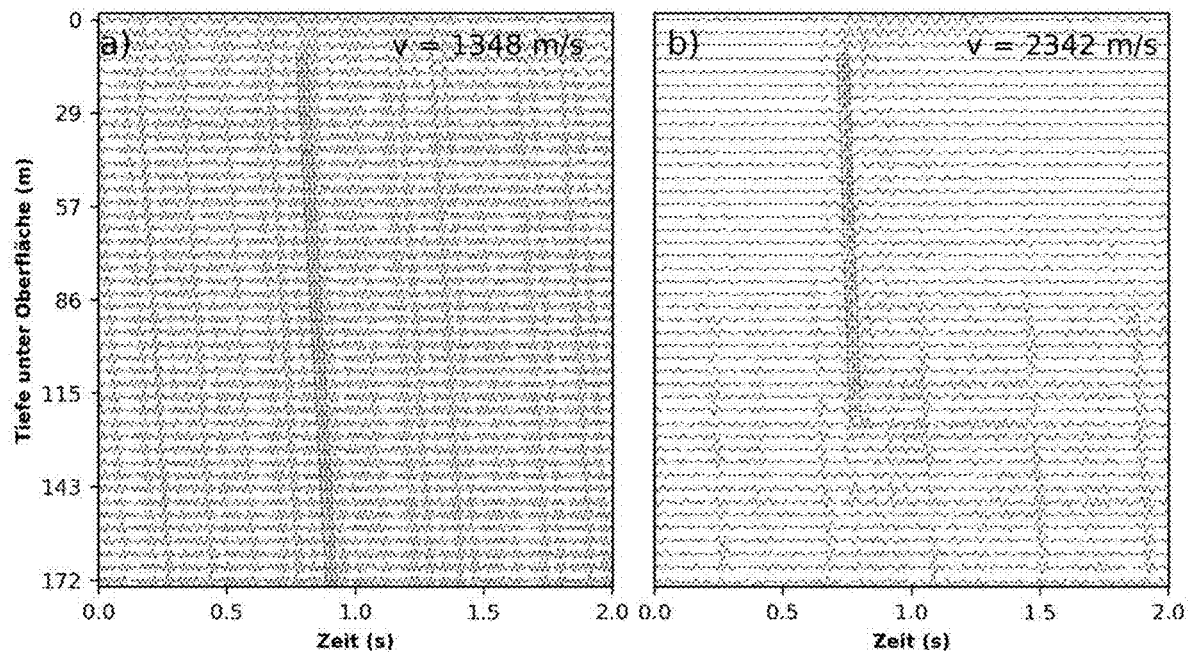
FIG. 1 Illustration of an example of a data set which was determined during work operations in the well.
Figure 2:
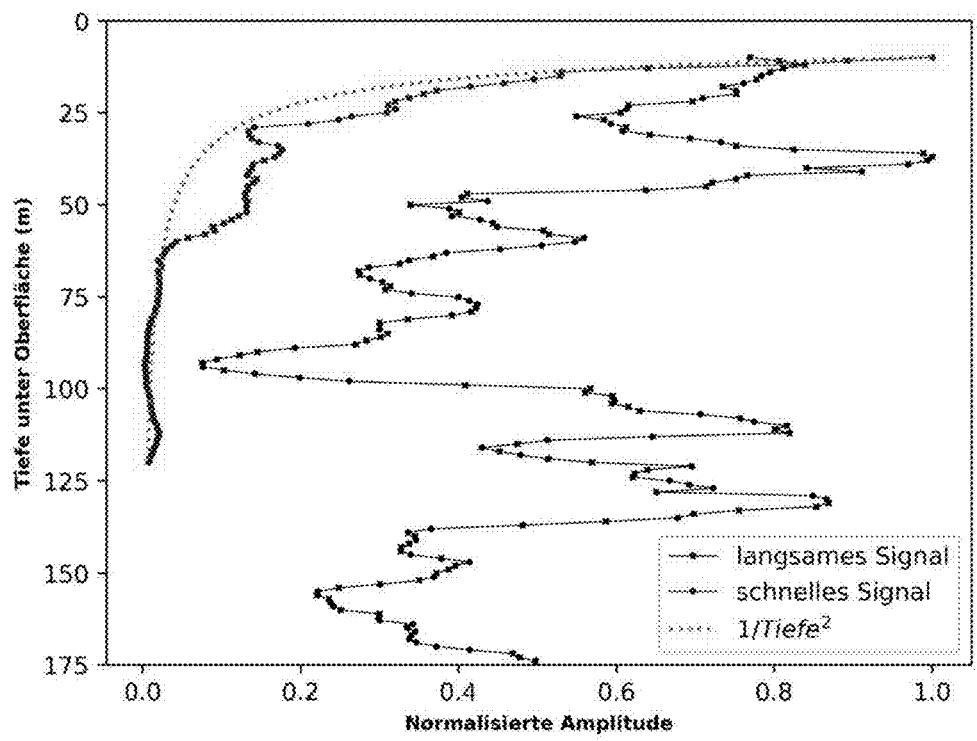
FIG. 2 Amplitude spectrum of the signals marked in FIG. 1.

Two examples for a typical data set are given in FIG. 1. In the data, periodic signals can be recognized. The marked areas were used for the determination of the signal speed and characteristic. In FIG. 1a), a signal with a propagation speed of 1348 m/s can be recognized. In FIG. 2, the amplitude distribution with the depth for the signals of FIG. 1 can be seen. In FIG. 1b), a clearly faster signal can be recognized, the amplitude of which decreases with the depth (FIG. 2). The amplitude decrease corresponds approximately to the ratio 1/depth$^2$.

Figure 3:
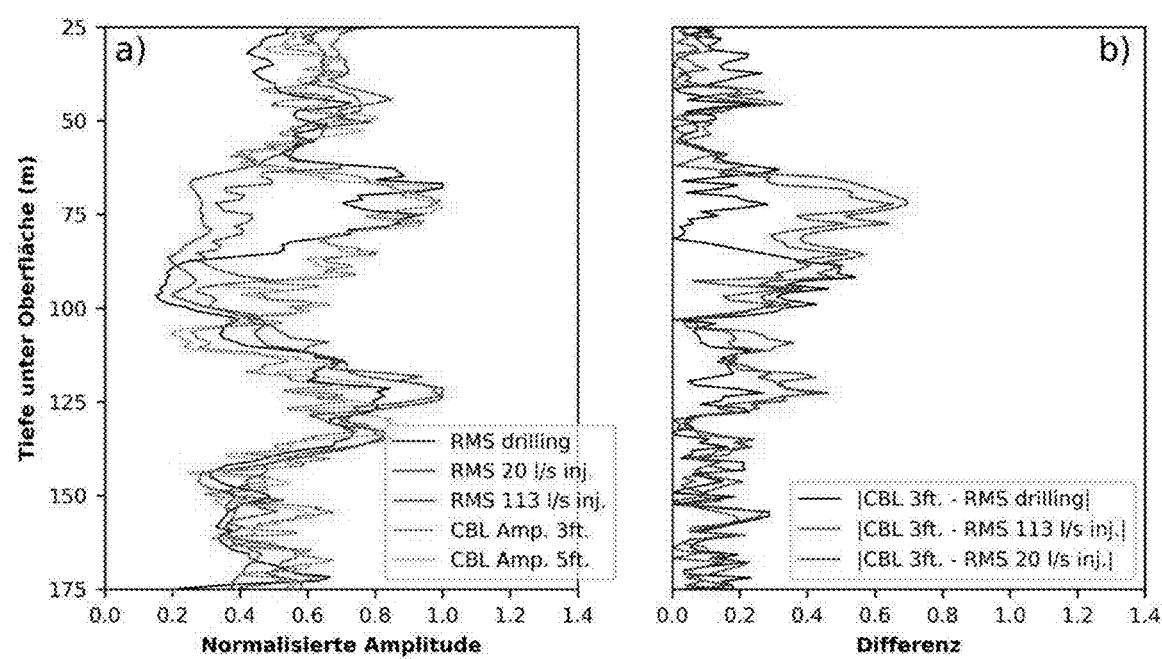
FIG. 3 Normalized noise amplitudes recorded during different work operations in the well together with normalized CBL amplitudes and difference between CBL data and normalized noise amplitudes.

FIG. 3, in contrast to FIG. 2, does not show the signal amplitude for a certain signal, but rather shows the mean noise amplitude over a time period of 20 minutes in the frequency range 30-60 Hz. Normalized noise amplitudes are shown, which, during different work operations in the well, were recorded together with normalized cement bond log (CBL) amplitudes (left). On the right, the difference between CBL data and normalized noise amplitudes is shown. The data during the drilling operations and during an injection test with 9 L/s and 113 L/s was collected, analyzed and compared. In addition, data of a conventional cement bond log (CBL) is shown.

The normalized amplitude of the CBL data shows similar trends over a large depth range compared to the normalized noise amplitude determined based on the fiber optic measurement data. The similarity is particularly great in the depth range >100 m. In the range 60-100 m, a clear deviation in the trend can be detected in the noise measurements during the injection test. The agreement is greater during the drilling work.

Interpretation

The determined measurement data clearly shows a relationship between the mean noise amplitude and the measured CBL amplitudes. CBL measurements are based on the refraction of sound waves at the boundary surface between borehole fluid and casing. Here, the measurement is primarily sensitive to the coupling between casing and cement. The better the coupling is, the lower the CBL amplitude is. By comparison, the optic measurement cable measures spatially distributed strain. This strain is brought about by a deformation of the measurement cable. The measurement cable, on the other hand, is expanded or compressed by the deformation of the surrounding material, that is to say the deformation of the casing and of the cement. The better the coupling between the individual components of the well (different pipes and cement) is, the lower the amplitudes measured are. The worse the coupling between casing and rock mass is, the greater the deformation is. This means that the fiber optic measurement cable makes it possible to draw conclusions regarding both the coupling properties of the cement and also the deformations of the casing. The signal source for the deformation can here come from outside (seismic signal) or from inside (fluid flow), as can be seen in FIG. 2. However, for signals from outside, the spherical divergence also must be taken into consideration.

The deviations in comparison to CBL data in the anchor casing string are highly systematic for the different work operations in the well. The deviations are influenced by the work taking place in the well. The measured noise amplitude is a measurement of the average coupling of the individual casings and cement layers to the rock mass. The difference will therefore be a function of the coupling properties of the additional annular spaces as well as of the performed work operations/the signal source. The measurement therefore also allows determinations concerning annular spaces located farther inside and outside, which is essentially impossible with conventional measurement methods.

Figure 4:
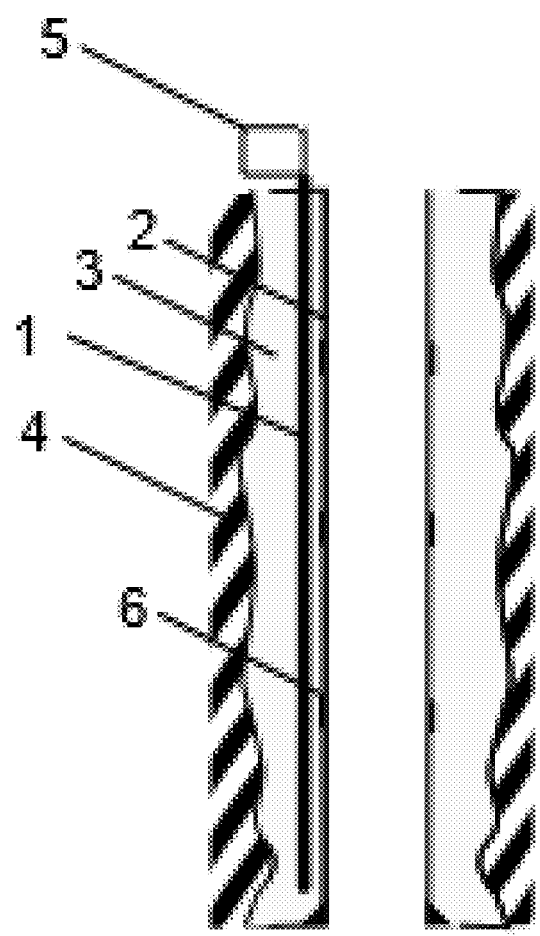
FIG. 4 Representation of a preferred embodiment of the invention.

FIGS. 4 to 7:

FIG. 4 shows a preferred embodiment of the invention. In particular, FIG. 1 shows a section through a borehole which is filled with a sealing material (3), for example, cement. In the example represented in FIG. 1, the at least one fiber optic measurement cable (1) is present arranged in the cement (3). For the purpose of the invention, this type of fiber incorporation is preferably referred to as "behind casing fiber installation." The cement (3) or the borehole is surrounded by rock (4), rock materials, or a rock formation (4). The measurement cable (1) is connected to a measurement device (5). For the purpose of the invention, the measurement device (5) is a component of a strain measurement device and/or of a strain change measurement device for processing the strain information or forms such a device. FIG. 1 shows moreover a casing (2) which is located in the borehole. The casing (2) comprises pipe connectors (6).

Figure 5:
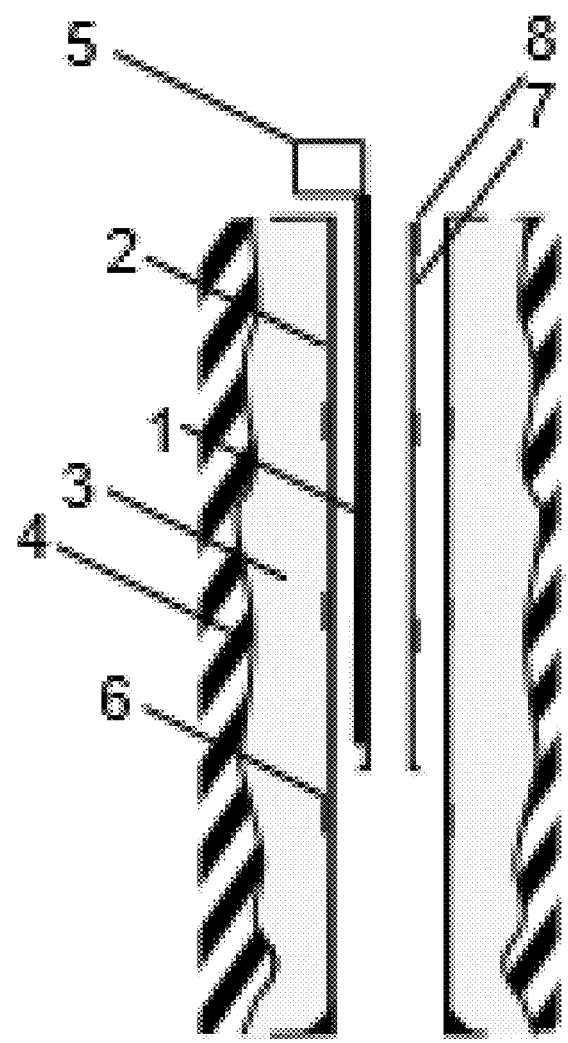
FIG. 5 Representation of a preferred embodiment of the invention.

FIG. 5 shows an alternative method for introducing the measurement cable (1) into the borehole, which, for the purpose of the invention, is preferably referred to as "behind tubing fiber installation." In the example represented in FIG. 2, measurement cables (1) are lowered into the well. Furthermore, in FIG. 2, a formation (4) is represented, which surrounds a borehole filled with a sealing material (3), for example, cement. Above the borehole, for example, on ground surface, the measurement device (5) is located, with which the measurements according to the proposed method can be carried out. FIG. 2 moreover shows a casing (2) which is present arranged in the borehole and which can have pipe connectors (6). The borehole example represented in FIG. 2 furthermore contains a production string (7) which, for the purpose of the invention, can also be referred to as tubing or production string. For the purpose of the invention, it is preferable that the production string (7) can also comprise one or more pipe connectors (8).

Figure 6:
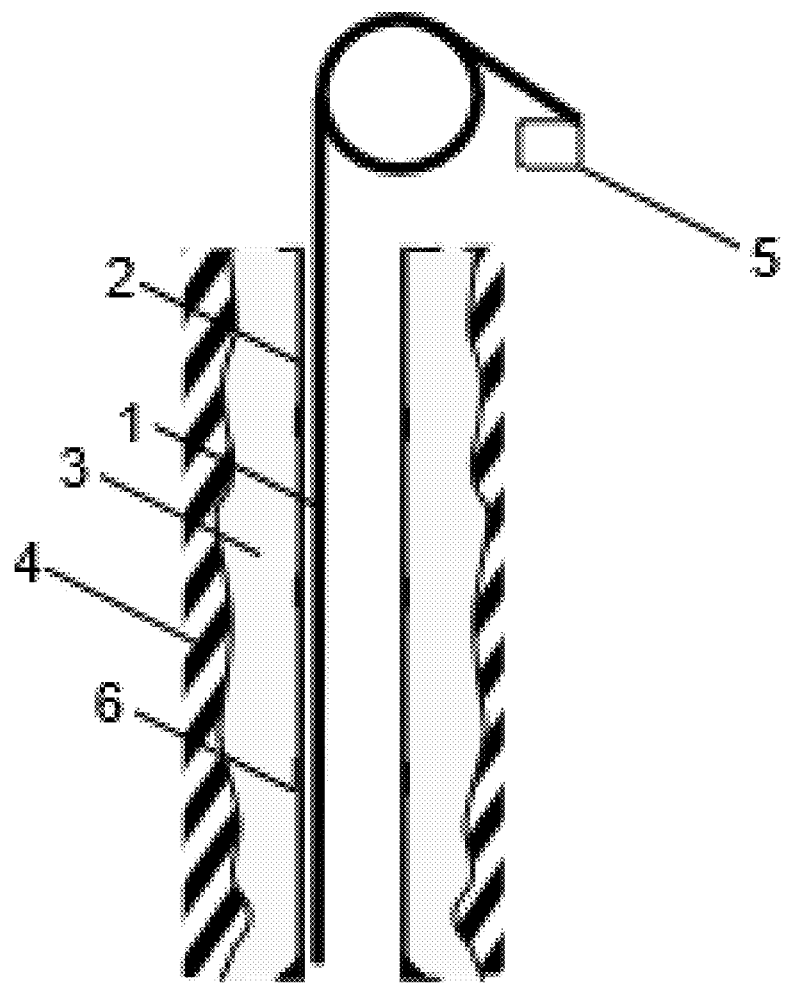
FIG. 6 Representation of a preferred embodiment of the invention.

FIG. 6 shows an additional example for a possible introduction of a measurement cable (1) into the borehole which, for the purpose of the invention, is preferably referred to as "wireline fiber installation." In this embodiment of the invention, the measurement cable (1) is lowered into the borehole and can be guided, for example, via a roller before it reaches the measurement device (5). In the borehole represented in FIG. 3, which is surrounded by a rock formation (4), the casing (4) is located, of which the connection to a sealing material (3), for example, cement, can be studied with the proposed method, inter alia. Preferably, the casing (2) comprises one or more pipe connectors (6).

Figure 7:
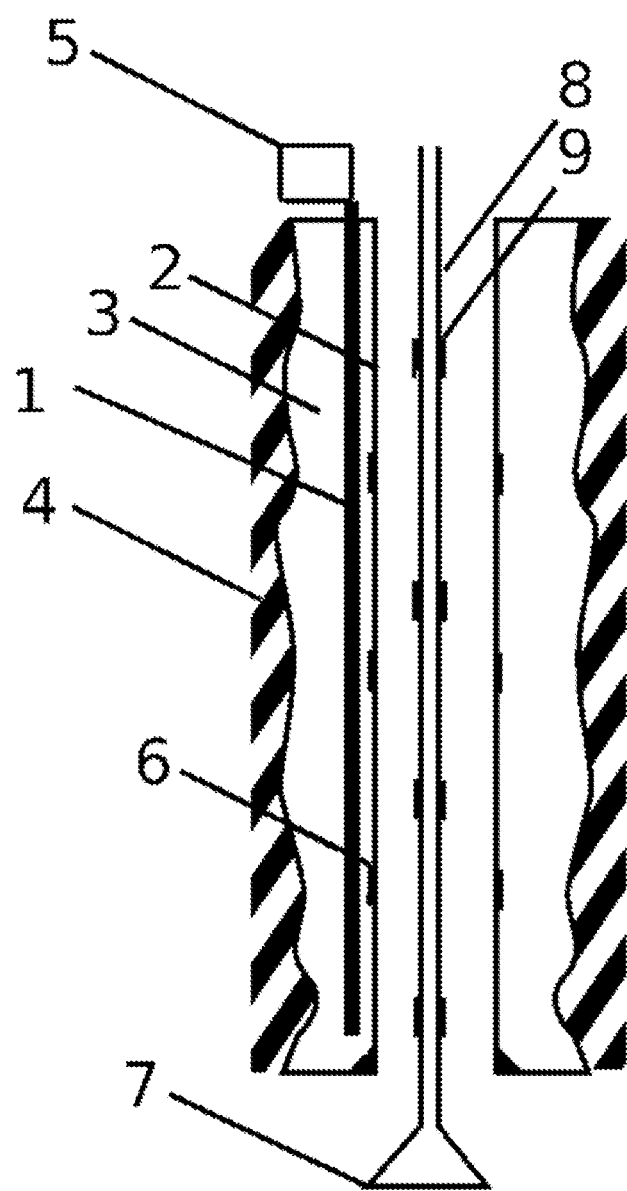
FIG. 7 Representation of a preferred embodiment of the invention.

FIG. 7 shows an embodiment of the invention in which the measurement cable (1) is arranged in the sealing material (3). In particular, FIG. 4 shows a preferred implementation of the invention, when a behind casing installation is used for monitoring the drilling process and/or the drill string (8) during borehole deepening operations. The borehole is surrounded by a rock formation (4) and filled with a material (3), for example, cement. The borehole comprises a casing 2) which can be provided with pipe connectors (6). The strain or strain change measurements are carried out with the measurement device (5). The drill string (8) is preferably arranged centrally in the borehole and can also comprise pipe connectors (9). The drill bit (7) is provided at the lower end of the drill string (8).

LIST OF REFERENCE NUMERALS

1 Measurement cable
2 Casing
3 Sealing material, for example, cement
4 Rock or formation
5 Measurement device
6 Pipe connector
7 Tubing or production string (FIG. 2) or drill bit (FIG. 4)
8 Pipe connector (FIG. 2) or drill string/drill pipe (FIG. 4)
9 Pipe connector

BIBLIOGRAPHY

[1] Raab et al. 2019, Real-Time Well Integrity Monitoring using Fiber-Optic Distributed Acoustic Sensing. SPE Journal, doi: 10.2118/195678-PA (in press).
[2] Hartog, A. H. An Introduction to Distributed Optical Fibre Sensors. Taylor & Francis Group 2017.
[3] Masoudi, A., Belal, M., and Newson, T. P. 2013. A distributed optical fibre dynamic strain sensor based on phase-OTDR. Meas. Sci. Technol. 24(8). https://doi.org/10.1088/0957-0233/24/8/085204
[4] Masoudi, A. & Newson, T. P. Contributed Review: Distributed optical fibre dynamic strain sensing. Review of Scientific Instruments, 2016, 87, 9.

The invention claimed is:

1. A method for monitoring borehole integrity by monitoring a support material (3) introduced into the borehole and an introduced device using at least one fiber optic measurement cable (1), comprising:

a) introduction of the at least one fiber optic measurement cable (1) into the borehole, and connecting the measurement cable (1) by at least one of a physical connection or a mechanical connection to at least one of the support material (3) or to the introduced device to achieve the monitoring of support material (3) or the introduced device;

b) performance of at least one of relative vibration or strain measurements within the borehole, wherein, as measurement signal, a time series of a strain and a strain change of at least one area of the fiber optic measurement cable (1) is used for the determination of a strain and of a strain change of the support material (3) surrounding the fiber optic measurement cable (1) in this area and of the introduced device surrounding the fiber optic measurement cable (1) in this area;

c) analysis of at least one of strain amplitudes or of a strain amplitude distribution by time series comparisons for different areas and different times for the determination of an at least area-by-area spatially resolved and time resolved distribution of information on the state of the support material (3) and of the introduced device; characterized in that, as distribution of information on the state, a distribution of the information on an acoustic impedance and on a mechanical coupling between support material (3), the introduced device and borehole surroundings are used, so that ambient noise amplitude is analyzed, which is defined by a superposition of acoustic impedance and mechanical coupling in order to determine areas in the borehole where an increased probability of the occurrence of material fatigue of the support material (3) and of the introduced device exists, wherein the information on at least one of the acoustic impedance and on a mechanical coupling is determined by comparison of measured strain amplitudes of different areas and times with a reference measurement, and wherein the reference measurement comprises one or more measurements under known conditions and is also used as a calibration method.

2. The method according to claim 1, characterized in that the introduced device comprises at least one of the casing (2) in the borehole or a drill string (8).

3. The method according to claim 1, characterized in that the information on a mechanical coupling is determined by a comparison of strain amplitudes of different areas and times, wherein a comparatively higher strain amplitudes mean a lower mechanical coupling or an increased material fatigue.

4. The method according to claim 1, characterized in that the measurement cable (1) is present introduced permanently or temporarily in the borehole.

5. The method according to claim 1, characterized in that at least one of the vibration or strain measurements comprise spatially distributed strain measurements.

6. The method according to claim 1, characterized in that an arrangement of the fiber optic measurement cable (1) in longitudinal direction along the borehole is carried out, and at least one of the strain or strain change cover(s) vertical areas of the fiber optic measurement cable (1).

7. The method according to claim 1, characterized in that the fiber optic measurement cable (1) is present arranged in a support material (3) in the borehole.

8. The method according to claim 1, characterized in that the fiber optic measurement cable (1) is at least one of lowered into the borehole or used in connection with a casing (2) in the borehole.

9. The method according to claim 1, characterized in that the support material (3) comprises a material that does at least one of which cures or which seals the borehole, in particular cement, wherein the measurements are carried out in at least one of during or after the curing of the support material (3).

* * * * *